M. SWEET.
CURRY-COMB.

No. 174,709. Patented March 14, 1876.

Witnesses:
W. B. Masson
H. R. Edelen

Inventor
Miles Sweet
by atty. E. E. Masson

United States Patent Office.

MILES SWEET, OF TROY, NEW YORK.

IMPROVEMENT IN CURRY-COMBS.

Specification forming part of Letters Patent No. 174,709, dated March 14, 1876; application filed December 29, 1875.

*To all whom it may concern:*

Be it known that I, MILES SWEET, of Troy, in the county of Rensselaer and State of New York, have invented certain new and useful Improvements in Curry-Combs, and that the following is a full, clear, and exact description of the same, reference being had to the accompanying drawings, making a part of this specification, in which—

Figure 1:
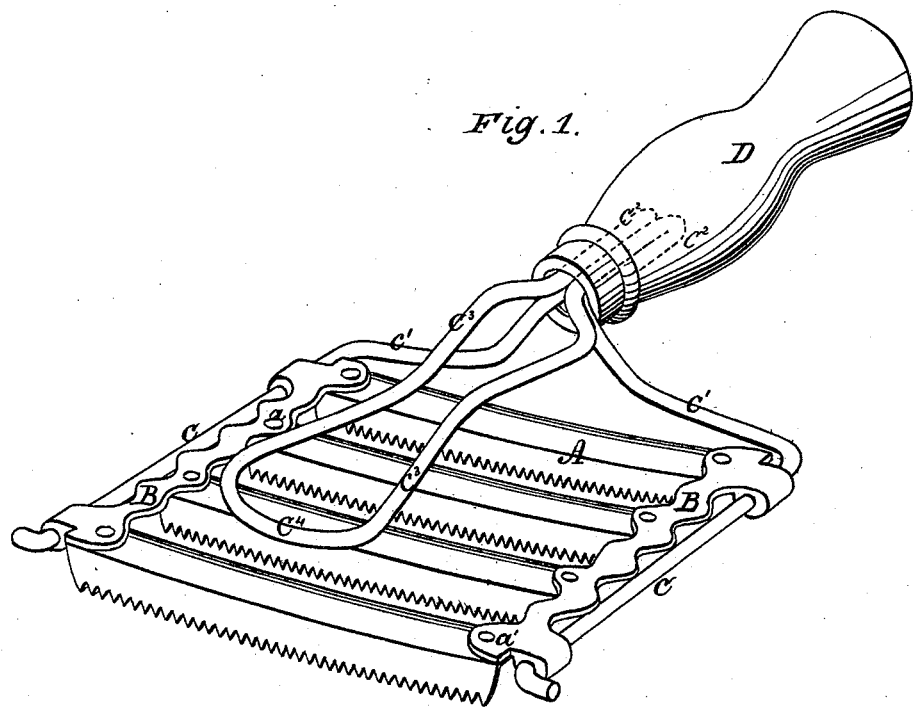
Figure 2:
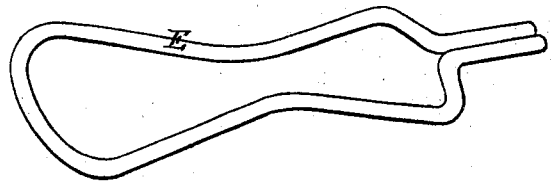
Figure 3:
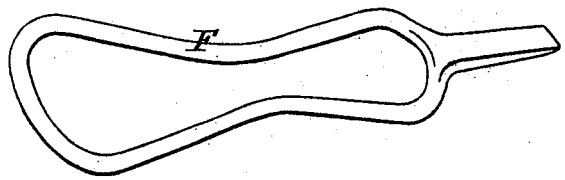

Figure 1 represents one of my curry-combs in perspective, showing the ordinary wooden handle, combined with a wire handle, located directly over the curry-comb. Fig. 2 represents a metallic handle, made of wire, that that can be easily applied to ordinary wooden-handle curry-combs. Fig. 3 represents a metallic handle, made of malleable iron, for the same purpose.

In using a curry-comb, it is often desirable to hold it with the hand as near to the back of the comb as possible, while at other times it is preferred to hold it farther, as it is generally done with the ordinary wooden handle; and to adapt the comb to either of these positions is the object of my invention, which consists in making a wire handle nearly similar in form to the one for which a patent was granted to me December 22, 1874, and prolonging the wires that form the shank of it between the handle and the side-braces, so as to furnish the length of wire necessary to form, after each one is bent and folded upon itself, a shank to connect it to an ordinary wooden handle.

To enable others skilled in the art to make and use my invention, I will proceed to describe the same with reference to the drawings.

A represents serrated bars of the curry-comb. They are connected together by means of the malleable end pieces B, to which they are fastened by rivets $a'$. The end pieces are provided with loops $b$, so formed as to clasp the wire C. This wire is bent and formed to constitute the braces $C^1$, that connect the curry-comb proper to the wooden handle D, where the wire is bent upon itself, so as to form a shank, $C^2$, that is forced into the opening provided in the wooden handle for its reception, and out of which it is bent outward, so as to form a wire handle $C^3$, which in that manner projects nearly horizontally directly over the curry-comb, and forms a loop at $C^4$.

I have found in practice that this two-handle curry-comb can most readily be made by first shaping the wire handle $C^3$, shank $C^2$, braces $C^1$, and side wires C in a nearly-direct prolongation of each other; then the wire from each straight portion is bent upon itself, so as to form a shank, $C^2$, for the wooden handle; then the malleable end pieces B are attached to the wires C by means of the loops $b$, and the comb-bars A are riveted to the end pieces. The wooden handle is then forced upon the shank, thus completing the two-handle curry-comb.

It is evident that each side-wire C, brace $C^1$, shank $C^2$, and side of wire handle $C^3$ may be formed separately, and be united at the loop $C^4$ by a connecting-sleeve, or even remain disconnected at that point.

In Fig. 2 is shown, at E, a metallic handle, made of wire, to be applied to ordinary wooden-handle curry-combs, so as to form with the latter a prolongation directly over the bars of the curry-comb, and in Fig. 3 is shown, at F, a similar handle, made of brass or malleable iron, for the same purpose.

Having thus fully described my invention, what I claim is—

1. In combination with the body of a curry-comb and the wooden handle D, the single wire C $C^1$ $C^2$ $C^3$ $C^4$, when bent so as form a reversed wire handle directly over the body of the curry-comb and a shank for the wooden handle, substantially as shown and described.

2. In combination with a curry-comb and its wooden handle D, the metallic handle F, when applied to said wooden handle in a reverse position to it, and directly over the body of the curry-comb, substantially as and for the purposes described.

MILES SWEET.

Witnesses:
WM. SHAW,
A. B. SLOCUM.